United States Patent [19]
McDermott, Jr. et al.

[11] Patent Number: 5,147,541
[45] Date of Patent: Sep. 15, 1992

[54] SPIRAL FILTRATION MODULE WITH STRENGTHENED MEMBRANE LEAVES AND METHOD OF CONSTRUCTING SAME

[75] Inventors: Thomas C. McDermott, Jr., Lynn; Daniel F. Skelton, Billerica, both of Mass.

[73] Assignee: Koch Membrane Systems, Inc., Wilmington, Mass.

[21] Appl. No.: 692,689

[22] Filed: Apr. 29, 1991

Related U.S. Application Data

[63] Continuation-in-part of Ser. No. 612,802, Nov. 14, 1990, abandoned.

[51] Int. Cl.⁵ .............................................. B01D 63/00
[52] U.S. Cl. ........................ 210/321.74; 210/321.83; 210/493.4; 156/290; 428/157; 428/170; 428/173
[58] Field of Search .............. 210/137, 321.61, 321.74, 210/321.82, 321.83, 321.78, 650, 232, 493.4

[56] References Cited

U.S. PATENT DOCUMENTS

| | | | |
|---|---|---|---|
| 3,504,796 | 8/1968 | Bray | 210/137 |
| 3,773,181 | 11/1973 | Calderwood et al. | 210/490 |
| 4,197,206 | 4/1980 | Karn | 210/461 |
| 4,235,723 | 11/1980 | Bartlett, Jr. | 210/497.1 |
| 4,548,714 | 10/1985 | Kirwan, Jr. et al. | 210/232 |
| 4,842,736 | 6/1989 | Bray et al. | 210/321.61 |
| 4,902,417 | 2/1990 | Lien | 210/321.74 |

FOREIGN PATENT DOCUMENTS

| | | |
|---|---|---|
| 1521045 | 8/1974 | United Kingdom . |
| 2063705 | 6/1981 | United Kingdom . |

*Primary Examiner*—Robert A. Dawson
*Assistant Examiner*—Ana M. Fortuna
*Attorney, Agent, or Firm*—Shook, Hardy & Bacon

[57] ABSTRACT

The subject of the present invention is an improved leaf packet useful in forming a spiral filtration module, the improved module which results from utilization of the leaf packet and a method of preparing the leaf packet. The membrane sheet utilized in forming a spiral filtration module is fused and densified in the area of its fold to increase the sheet density in this area and thus provide protection against mechanical failure. The densification includes the application of heat and pressure to the membrane surface of the sheet so as to densify the membrane surface and seal it against the penetration of feed stream liquid while also densifying the membrane, the backing and an optional reinforcing strip (if utilized).

19 Claims, 2 Drawing Sheets

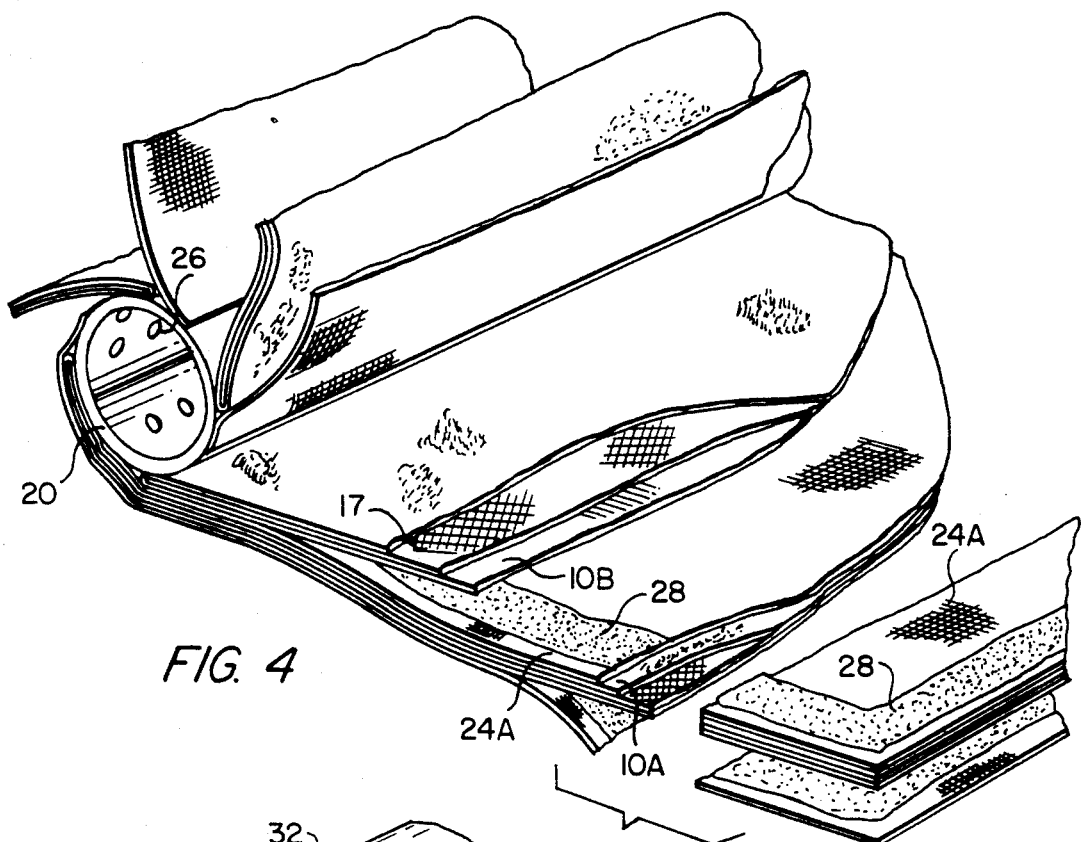
FIG. 4
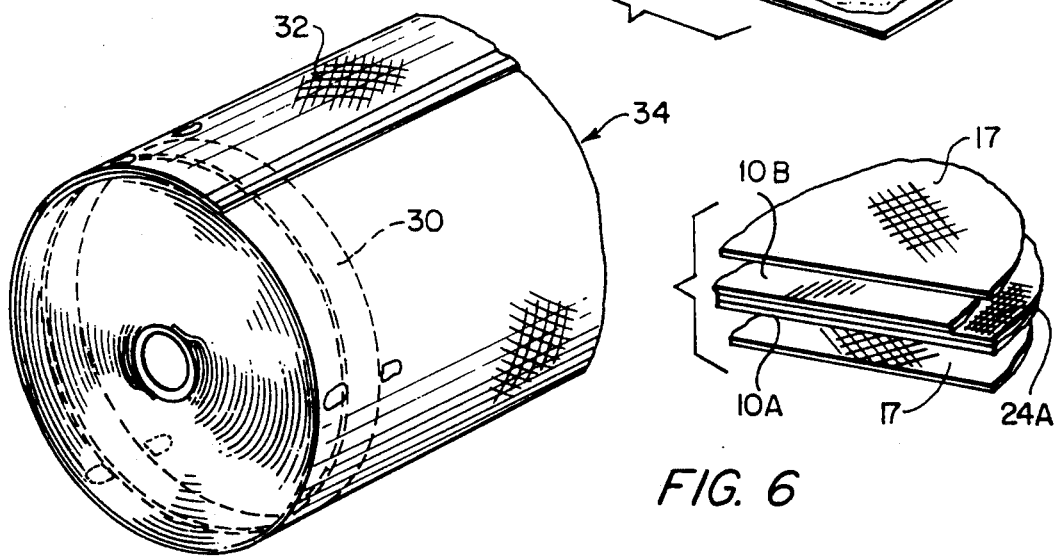
FIG. 5
FIG. 6
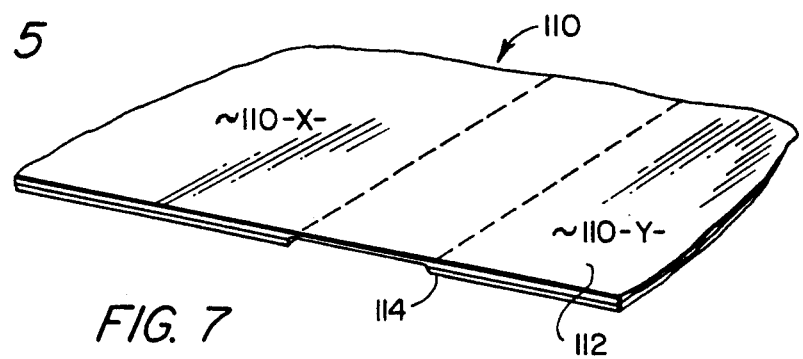
FIG. 7

SPIRAL FILTRATION MODULE WITH STRENGTHENED MEMBRANE LEAVES AND METHOD OF CONSTRUCTING SAME

This is a continuation-in-part of application Ser. No. 612,802, filed Nov. 14, 1990, now abandoned.

BACKGROUND OF THE INVENTION

This invention relates generally to ultrafiltration technology and, more particularly, to a spiral wound filtration module for use in cross-flow filtration and to a method of constructing same.

The term "ultrafiltration" as used in the present application is intended to encompass microfiltration, nanofiltration, ultrafiltration and reverse osmosis and gas separation. A typical ultrafiltration device comprises a plurality of spiral wound filtration modules through which a fluid to be filtered passes. Such a module is made by winding one or more membrane leaves and permeate envelopes around a permeate tube. The membrane leaves are separated by feed spacer screens which are of a relatively large mesh size to accommodate fluid flow. The permeate passes through the membrane surface of the membrane leaves and is directed to the permeate tube by a permeate carrier sheet. Some type of external restraining means such as a hard shell, straps or a bypass screen, or a combination thereof may be used to hold the spirally wound leaves in tight formation around the tube. The spiral module is then loaded into a housing or pressure vessel which is operated at a slight pressure drop across the module as the fluid being filtered flows through. Concentrate is removed from one end of the module and permeate is removed from the permeate tube Many applications of ultrafiltration technology involve food processing where sanitary conditions must be maintained at all times. This necessitates periodic cleaning with relatively harsh chemicals such as (by way of example only) chlorine containing compounds, other oxidizing agents, acids, alkalies and surfactants. These chemicals tend to degrade the membrane material, particularly in areas that are subject to stress. A typical procedure for constructing spiral filtration modules includes folding a membrane sheet in the area that is to be adjacent to the permeate tube. This fold area creates mechanical stresses in the membrane sheet both at the crease and at the point of the contact with the adjacent permeate carrier sheet. Other stress areas in a spiral wound membrane include the location of overlap between two membrane leaves and the overlap of the membrane with any underlying stitching or mechanical fastening devices.

It is typical to employ some type of reinforcing in the fold area so as to reduce the mechanical stresses and prolong the life of the membrane. Two primary techniques are well known to those skilled in the art. The first is the utilization of reinforcing tape which is applied at the crease and extends outwardly from the crease a short distance over what is typically referred to as the fold area of the membrane. The second method of membrane reinforcement is to apply an adhesive in generally the same area as that to which the tape is applied and for the same effect. An example of this second method is contained in the Bray, et al. U.S. Pat. No. 4,842,736. This patent further discloses a modification of the second method wherein, in place of a flowable adhesive, a soft melt thermoplastic material is employed from the backing side of the membrane to fill the interstices of the backing material and penetrate the thickness of the backing all the way to the actual membrane material.

The difficulties with these prior art techniques for strengthening the fold area of a spiral membrane are that the tape tends to eventually lose its adhesion and peel away, and glue is applied at a thickness such that, while the membrane is strengthened in the fold area, the glue has a tendency to create new stress points especially along its terminal edge. Both prior art techniques increase the thickness of the membrane leaf at the line of transition between reinforced and unreinforced membrane which is also a factor in introducing new stress points. Also, when either tape or glue is applied to the membrane surface (as opposed to the membrane backing), failure of either material may expose a "dead area" between the membrane surface and the failed glue or tape where the fluid being filtered may collect causing sanitation and eventual leakage problems. If the reinforcing is applied to the backing of the membrane, as contemplated in the referenced patent to Bray et al., there is no protection against surface cracks in the membrane itself at the crease or fold creating small crevices where fluid can collect and under some conditions create sanitation problems.

OBJECTS OF THE INVENTION

It is therefore an object of the present invention to provide an improved ultrafiltration module and method of constructing same wherein the membrane material is strengthened in the fold area adjacent to the permeate tube which strengthening is accomplished without introducing stress points which can result in degradation and failure in the area about the fold.

Another one of the objectives of our invention is to provide an improved ultrafiltration module and method of constructing same which avoids the use of glue or tape in the fold area and the inherent problems associated with these materials.

It is also an objective of this invention to provide an improved ultrafiltration module and method of constructing same which has had the membrane sheet densified through a fusion process to alter the physical properties of the membrane material by collapsing the membrane structure at the membrane surface while also densifying the membrane and providing structural reinforcing.

It is also one of the aims of this invention to provide an improved ultrafiltration module and method of constructing same wherein the filtration membrane is strengthened without introducing physical discontinuities into the membrane which may eventually result in membrane leakage.

Still another object of this invention is to provide an improved ultrafiltration membrane and method of constructing same which in one embodiment utilizes a membrane reinforcing member that is fused to the membrane backing in the fold area.

An important aim of this invention is to provide an improved ultrafiltration module and method of constructing same wherein the membrane fold area is densified and sealed by fusing the membrane backing to the membrane and to the reinforcing material while densifying and sealing the membrane surface thus greatly reducing the chances for liquid to become trapped in small crevices or voids beneath or adjacent to the membrane surface.

Other objects of the invention will be made clear or become apparent from the following description and claims.

DESCRIPTION OF THE DRAWINGS

In the accompanying drawings which form a part of the specification and are to be read in conjunction therewith and in which like reference numerals are used to indicate like parts in the various views:

FIG. 4 is a perspective view similar to FIG. 3 showing further details of construction of the individual leaf members which make up the ultrafiltration module;

FIG. 5 is a fragmentary perspective view of a completed module;

FIG. 6 is an exploded fragmentary perspective of a membrane leaf sandwiched between two feed channel spacers; and FIG. 7 is a perspective view of an alternative form of the invention.

DETAILED DESCRIPTION OF THE INVENTION

Figure 1:
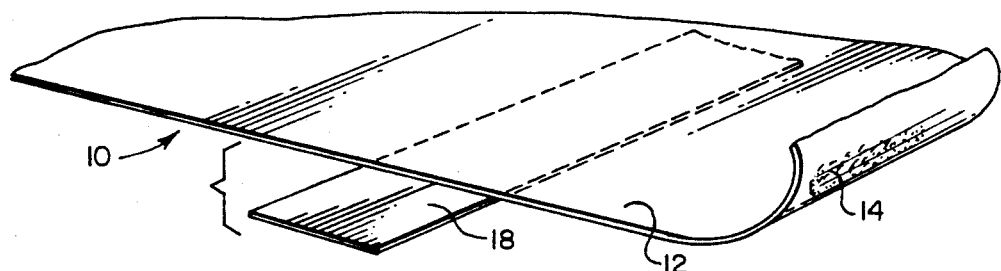
FIG. 1 is a fragmentary exploded perspective view of an ultrafiltration sheet to which a reinforcing material is to be applied.

Referring initially to FIG. 1, an ultrafiltration membrane sheet is designated generally by the numeral 10 and comprises an ultrafiltration membrane 12 and a backing material 14. The membrane and the backing are integrally joined by techniques well known in the art to form the membrane sheet. Acceptable membrane materials include a wide range of thermoplastic resins which can be fabricated into a sheet having a pore structure and filtration capability. Known thermoplastic membrane materials include polysulfone, polyvinylidene fluoride, polyethersulfone, polyarylsulfone, polyvinylchloride, polyamides, cellulose acetate, polycarbonates, polytetrafluoroethylene, polyphenylene sulfide, polyethylene, polyethyleneterephthalate, polyamide-imide and polypropylene. Natural membrane materials such as cellulose may also be employed. A preferred material is polyethersulfone.

Acceptable backing materials are woven or nonwoven synthetic materials having the strength necessary to reinforce the membrane and the ability to be integrally bound to the membrane while not interfering with the passage of permeate through the membrane. Suitable backing materials include polyester, polypropylene, polyethylene, and the family of polyamide polymers generally referred to as "nylon".

Following accepted practice for constructing spiral wound ultrafiltration modules, a membrane leaf packet designated generally by the numeral 16 (FIG. 2) is prepared in the following manner. Membrane sheet 10 is divided to present first and second sheet sections 10-X and 10-Y. This may be accomplished by cutting across membrane sheet 10 or by folding across the sheet width as indicated in the drawings. The two sheet sections are then positioned with their ends in planar alignment with backing 14 to the outside and the two membrane surfaces 12 facing each other. A relatively large mesh screen material presents a channel feed spacer 17 which is inserted between sheet sections 10-X and 10-Y. In most instances, the feed spacer will be utilized but it is possible to construct a module without this component.

Prior to folding the membrane sheet 10 to form the leaf packet 16, aforedescribed, the sheet is densified in the fold area which is also the area of the aligned ends so as to provide increased strength and durability. Densification is preferably carried out by utilizing a thermoplastic or thermoset reinforcing material such as strip 18 that is compatible with and will fuse to membrane sheet 10, preferably to backing 14. Suitable reinforcing materials include polypropylene, polyethylene, and polyvinylbutyral and ionomer resins. A preferred material is an ionomer resin sold under the trademark Surlyn by E. I. DuPont de Nemours and Company of Wilmington, Del., U.S.A. The reinforcing strip 18 is placed on backing material 14 and then is fused to the sheet 10 by the application of heat and pressure from the membrane side of sheet 10. It may be desirable to wash or apply other surface treatment to the membrane or backing prior to fusing. Surface treatments may include solvents, surfactants or other chemicals alone or in combination. For most of the known membrane polymers and backing materials previously noted, a temperature of between 250° and 500° F. applied for one to six minutes along with a pressure which may be nominal (such as results from the weight of the heat source on the membrane) up to 200 pounds per square inch (p.s.i.) will achieve an integral fusing of the reinforcing strip and the membrane sheet. A temperature range of 400° to 500° F. and a pressure of 20 to 100 p.s.i. is the preferred operating range. For the preferred material (Surlyn) noted above, a temperature of approximately 400° F. applied for about 60 seconds along with a pressure of 75 p.s.i., followed by gradual cooling under the same pressure for approximately 60 additional seconds, presents a product meeting the objectives of the invention.

Generally, it is highly desirable to utilize relatively high melting point materials or materials having a relatively high glass transition temperature (e.g., above 400° F.) for the membrane material since the heat and pressure are applied to the membrane side. The glass transition temperature of the preferred membrane material, polyethersulfone, when in membrane sheet form, is approximately 410° F.

To accomplish fusing of the backing 14 to the membrane material 12 the backing will normally have a somewhat lower glass transition temperature so that the heat from the membrane side, after passing through the membrane, will yield a temperature that is at least equal to or slightly above the backing glass transition temperature. This ensures fusing of the backing to the membrane. The preferred backing material, polyester, has a glass transition temperature of approximately 170° F.

The glass transition temperature of the reinforcing strip 18 should also be substantially below that of the membrane material so that the heat from the membrane side will be sufficient to fuse the reinforcing to the backing. The glass transition temperature of the preferred reinforcing material, an ionomer resin, is approximately −40° F. and the melting point of this material is 185° F. The heat source applied to the membrane side of the sheet 10 should be sufficient so that the temperature at the interface of the backing and reinforcing approaches the melting point of the ionomer being utilized as the reinforcing material.

A thermal impulse sealer utilizing a nichrome wire shielded inside of a Teflon ® (registered trademark of E. I. DuPont de Nemours and Co. of Wilmington, Del., U.S.A.) covered flat bar and operated by a skilled technician is an acceptable and efficient means for accomplishing the fusing. The amount of pressure applied is less critical than the application temperature and it will be appreciated that wide variations in pressure are possible depending upon the particular materials that are employed. In some instances the weight of the heating source on the material may be sufficient.

It is important that the application of heat and pressure be made from the membrane side 12 of sheet 18 to accomplish the desired densification of the membrane material as well as fusing of the membrane backing and reinforcing materials. By densification, it is meant that the membrane surface pores are sufficiently collapsed so as to render the membrane surface impermeable. This densification of the membrane material strengthens it and, by rendering the membrane impermeable, precludes the substance being filtered from entering structural voids in the membrane where it can collect and create sanitation problems. A reliable indication of when the desired level of densification has been achieved for the preferred polyethersulfone membrane is when the membrane appearance changes from milky white to highly translucent. The densification step also encompasses an increase in the density of the backing and reinforcing materials to such an extent that the final thickness of the densified composite is approximately the same as the thickness of the unreinforced membrane sheet 10.

The term "fusing" is meant to encompass the joining of separate, independent materials by the application of heat and at least minimal pressure to approach or exceed the glass transition temperatures of the materials such that the final composite which is substantially homogeneous at the interface of the different materials cannot be separated without at least partial destruction of the joined materials.

It is, of course, to be understood that the "fusing" may be accomplished utilizing a variety of heat sources including ultrasonic welding, radiation, and other known techniques or a combination of any heat and pressure sources which will bring about the physical change defined above. The fusing and membrane densification will generally occur substantially simultaneously.

Figure 2:
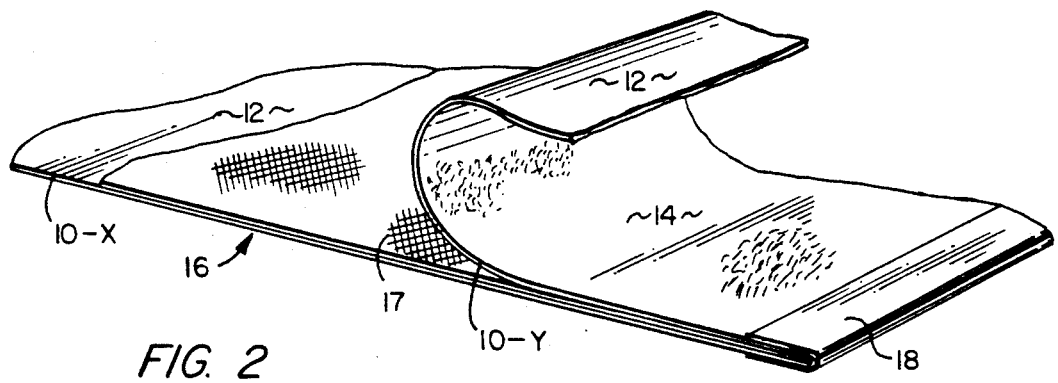
FIG. 2 is another perspective view showing a leaf packet prepared according to the present invention.

Returning now to the drawings, reinforcing strip 18 as it appears after sheet 10 is folded to present packet 16 is shown in FIG. 2. It is to be understood that the thickness of strip 18 and the demarcation between it and backing 14 have been exaggerated in FIG. 2 for purposes of illustration while in actual practice the fusing of the strip 18 to the sheet 10 simultaneously with the densification of the sheet will result in the membrane, membrane backing and reinforcing strip all being substantially integrally fused together with virtually no increase in total thickness of the reinforced sheet over the original thickness of sheet 10.

Figure 3:
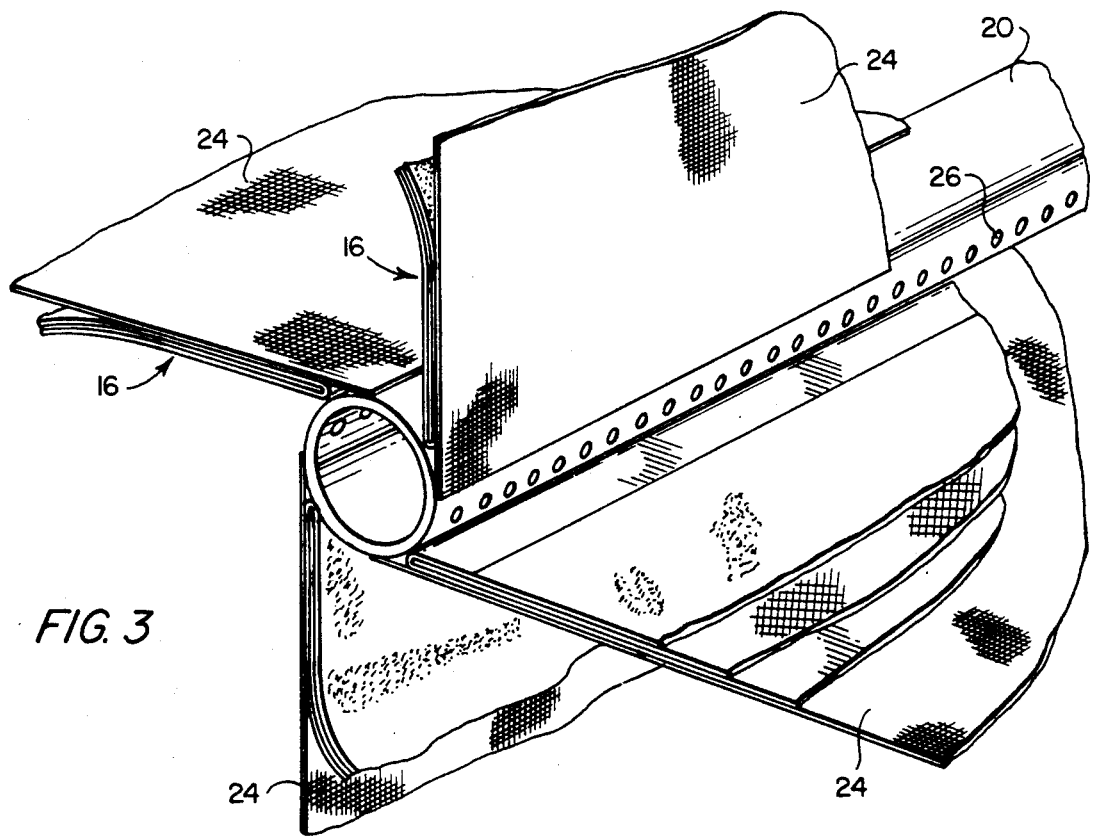
FIG. 3 is a fragmentary perspective view of a permeate tube around which a plurality of leaf packets and feed channel spacers are positioned.

Turning now to FIG. 3, a permeate tube 20 is shown with four leaf packets 16 circumferentially spaced around it. Permeate carrier sheets 24 are placed between each two leaf packets 16 to direct permeate to the interior of tube 20 through openings 26.

Referring to FIG. 4, one leaf packet 16 and permeate carrier sheet 24 are in place on tube 20, the membrane leaves of the completed spiral module are formed in the following manner. A membrane sheet 10A from one leaf packet is laid on a flat supporting surface and is then overlaid with a permeate carrier sheet 24A. A quantity of adhesive 28 is applied along the edges and across the width of carrier sheet 24A in the manner illustrated in FIG. 4. A membrane sheet 10B from the next adjacent leaf packet 16 is then brought into contact with adhesive 28 so as to form a completed membrane leaf comprised of the two membrane sheets 10A and 10B separated by permeate carrier sheet 24A. Each membrane leaf is separated from an adjacent leaf by a feed channel spacer 17 from the previously assembled leaf packet. This construction is most clearly shown in the exploded view of FIG. 6. The final spiral wound assembly utilizes restraining bands 30 (FIG. 5) to hold the membrane leaves in place and an outerwrap 32 may be used to complete the module; the completed module being designated by the number 34.

In the alternative embodiment of the invention shown in FIG. 7, membrane sheet 110 comprising membrane 112 and backing 114 has been treated to fuse and densify the area between the two broken lines (the fold area and the area of planar alignment of the ends of the two sheet sections 110-X and 110-Y) by the application of heat and pressure to the membrane side 112. While not accomplishing the same degree of densification as in the embodiment previously described, for some applications sheet 110 will prove to be adequate. A leaf packet is prepared from sheet 110 in the same manner as described previously for packet 16. Likewise, formation of the completed module utilizing sheet 110 to form the membrane leaves will be identical to the procedure described for the embodiment of FIGS. 1-6.

The invention thus encompasses a method of preparing a leaf packet useful in forming a spiral filtration module which comprises providing two membrane sheet sections that have their ends in planar alignment (such as by folding a large sheet along the width to present two equal size sheet sections), fusing a reinforcing material to the membrane sheet in the area of said aligned ends, simultaneously densifying the sheet along with the reinforcing, and providing a feed channel spacer (if desired) and locating it between the two sheet sections, followed by joining the sheet sections (such as by stapling the sections together) to present the leaf packet. The densification treatment includes the application of both heat and at least nominal pressure, the heat being at a level approaching the glass transition temperature of the membrane material at the membrane surface and at least approaching the glass transition temperature of the backing as the heat reaches this material to fuse the backing and membrane materials at the fold area (or its equivalent in the case of two separate sheets), and may also include fusing a reinforcing material to the backing of the membrane. It is desirable to carry out the fusing to such an extent that the membrane 12, backing 14, and the reinforcing material (if utilized) are "fused" as that term is defined herein and also to accomplish densification of the membrane surface.

It is inherent in any porous material that is utilized to make membrane surface 12 that certain voids will be present in the finished product. In the event of membrane failure these voids present areas for accumulating feed stream liquid which can cause serious sanitation problems in some applications. The present method and article densify the membrane to such an extent that the membrane surface is sealed to the passage of fluid thus greatly reducing the possibility of contamination from liquid accumulating in any of the membrane void areas. The densification will also reduce the size of some subsurface voids while completely eliminating others to further reduce the risk of contamination. The fact that the present invention provides for a combination of fusing and densification of the membrane sheet greatly reduces the chances of membrane failure not only through strengthening the membrane but by sealing the membrane surface to the passage of liquid. It is particularly surprising that the fusing step encompassed by the invention has the desired strengthening effect, especially at the leading edge of the fuse, since it is well known that the application of heat to polymer materials may cause stresses which weaken the polymer once the heat is removed.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without department from the scope thereof, it is to be understood that all matter herein set forth or shown in the accompanying drawings is to be interpreted as illustrative and not in a limiting sense.

Having thus described the invention, we claim:

1. A leaf packet useful in forming a spiral filtration module and comprising:
   a membrane sheet comprised of a membrane material and a backing material and presenting first and second sheet sections each having at least one end in planar alignment with an end of the other section,
   said membrane material having a surface integrally joined to a facing surface of the backing material,
   both said membrane material and said backing material being characterized by undergoing physical change as the glass transition temperature of said materials is approached,
   a surface of said membrane material opposite that joined to the backing material being densified in the area of said aligned ends, and
   said sections being further densified throughout their cross section in said area and fused in the area of the membrane/backing interface.

2. The invention of claim 1, wherein said sheet has been fused by the application of heat.

3. The invention of claim 1, wherein said sheet has been fused by the application of heat and pressure.

4. The invention of claim 3, wherein is included a reinforcing material fused to the backing material of said sheet in the area of said aligned ends.

5. The invention of claim 4, wherein said reinforcing material is fused to said backing material.

6. The invention of claim 1, wherein is included a feed channel spacer sandwiched between said first and second sheet sections.

7. The invention of claim 1, wherein said membrane material has a glass transition temperature that is higher than the glass transition temperature of said backing material.

8. A spiral filtration module for separating a fluid into a filtrate portion and a permeate portion, said module comprising:
   a permeate carrier tube having a plurality of openings in the tube wall for receiving said permeate portion;
   at least one leaf packet spirally wound around said tube,
   said packet comprising a membrane sheet including a membrane material and a backing material and presenting first and second sheet sections each having at least one end in planar alignment with an end of the other section,
   said membrane material having a surface integrally joined to a facing surface of the backing material,
   both said membrane material and said backing material being characterized by undergoing physical change as the glass transition temperature of said materials is approached,
   said membrane material being characterized by a densified surface opposite said surface joined to the backing material in the area of said aligned ends,
   said sections being further densified throughout their cross section in said area and fused in the area of the membrane/backing interface; and
   permeate carrier means spirally wound around said tube between each of said leaf packets and joined to each adjacent ultrafiltration sheet along the sides and across the width of the carrier means.

9. The invention of claim 8, wherein said membrane sheet has been fused by the application of heat.

10. The invention of claim 8, wherein said membrane sheet has been fused by the application of heat and pressure.

11. The invention of claim 8, wherein is included a reinforcing material fused to the backing material of said membrane sheet in the area of said aligned ends.

12. A method of preparing a leaf packet useful in forming a spiral filtration module, said method comprising:
    providing a membrane sheet comprised of a membrane material and a backing material and arranged to present first and second sheet sections each having at least one end in planar alignment with an end of the other section,
    said membrane material having a surface integrally joined to a facing surface of the backing material,
    both said membrane material and said backing material being characterized by undergoing physical change as the glass transition temperature of said materials is approached,
    densifying a surface of said membrane material opposite the surface of the membrane material joined to the backing material in the area of said aligned ends;
    fusing said backing material and said membrane material in the area of said aligned ends and further densifying said sheet throughout its cross section in said area; and
    joining said sections together to present said leaf packet.

13. A method as set forth in claim 12, wherein said fusing comprises the application of heat.

14. A method as set forth in claim 13, wherein said fusing comprises the application of heat and pressure to the membrane side of said sheet.

15. A method as set forth in claim 14, wherein said fusing comprises raising the temperature of said sheet to approximately the glass transition temperature of said membrane material.

16. A method as set forth in claim 12, wherein said fusing step comprises fusing a reinforcing material to said backing material.

17. A method as set forth in claim 12, wherein said fusing comprises the application of heat and pressure.

18. A method as set forth in claim 12, wherein said sheet comprises an ultrafiltration membrane and a membrane backing and said fusing step comprises applying heat and pressure to said sheet.

19. A method as set forth in claim 12, wherein said densifying and said fusing steps occur simultaneously.

* * * * *